United States Patent [19]

Maccabee et al.

[11] Patent Number: 4,975,887
[45] Date of Patent: Dec. 4, 1990

[54] BISTATIC SIDE SCAN SONAR

[75] Inventors: Bruce S. Maccabee, Silver Spring; Charles E. Bell, Rockville, both of Md.

[73] Assignee: The United States of America as represented by the Secretary of the Navy, Washington, D.C.

[21] Appl. No.: 2,832

[22] Filed: Jan. 9, 1987

[51] Int. Cl.$^5$ .............................................. G01S 15/00
[52] U.S. Cl. ................................................... 367/88
[58] Field of Search .......................... 367/88, 103, 105; 342/25

[56] References Cited

U.S. PATENT DOCUMENTS

| | | | |
|---|---|---|---|
| 3,978,444 | 8/1976 | Hitchcock | 367/88 |
| 4,030,096 | 6/1977 | Stevens et al. | 367/88 |
| 4,247,923 | 1/1981 | DeKok | 367/88 |
| 4,403,311 | 9/1983 | Tournois | 367/88 |
| 4,493,064 | 1/1985 | Odero et al. | 367/88 |
| 4,551,724 | 11/1985 | Goldstein et al. | 367/88 |

Primary Examiner—Thomas H. Tarcza
Assistant Examiner—Daniel T. Pihulic
Attorney, Agent, or Firm—Kenneth E. Walden

[57] ABSTRACT

This discloses an improved side-scan sonar capable of locating objects on the ocean floor including the strip directly beneath the sonar transmitter and receiver, which in prior arrangements had to be obtained by another pass. The arrangement includes a platform having acoustic transmitters spaced apart a substantial distance on either side of acoustic receivers. The transmitter on the right directs its acoustic output to the left and the transmitter on the left directs its acoustic output to the right for increased shadow forming and enhanced detection by the receiver of objects of height directly beneath the receiver.

6 Claims, 3 Drawing Sheets

BISTATIC SIDE SCAN SONAR

BACKGROUND OF THE INVENTION

It is known in the art to provide underwater acoustic transmitting and receiving systems towed at a constant speed through the water at a constant elevation above the ocean floor while emanating a narrow fan shaped vertically oriented acoustic beam whereby successive scan passes cover adjacent narrow strips of the submerged surface. By this system there is produced a display or record of sonic echo from objects of height on the bottom. This process is enhanced when the acoustic beams are transmitted at shallow angles to the bottom. As the vehicle or platform which carries the transducer is towed along in the water a narrow beam of pulsed sonic energy is transmitted to opposite sides, usually at different frequencies. The intersection of each pulse with the bottom travels outwardly along the bottom, and return as a sonic echo from which values are displayed and recorded.

This is known as side-scan sonar, and it is employed for analyzing the sea bed in narrow juxtaposed linear strips by deducing the echo profile therein. Acoustic transmitters and receivers are carried on board a vehicle, sometimes known as a fish, which is towed along near the bottom at a constant speed and elevation. Two emitting transducers broadcast in different frequencies in opposite directions toward the ocean bottom. Each pulse covers a lateral strip on either side of the vehicle. A receiver is tuned with the transmitters and receives echoes from the strip area. Present side-scan sonar in searching for objects on the ocean floor is limited to areas of strips on either side of the vehicle's line of travel, and excludes a strip (gap) directly beneath the vehicle.

Present side-scan apparatus has the transmitter and receiver close together, making a monostatic echo arrangement. Side-scan sonar produces a "picture" of a narrow strip of the bottom. The picture is a display of the echo strengths as a function of position along the strip. The strip has a width that is determined by the beam forming properties of the receiver array and therefore lies in a plane perpendicular to the axis of the array. The display of the echoes induced by the outgoing pulse relies on shadowing effects—the pulse is blocked from reaching the bottom and thus returns any echo from objects of some size sticking up from the bottom. The resolution of the sonar determine the sizes of the objects that can be detected this way. Objects directly below the receiver/transmitter are "illuminated" from above by the source pulse, and, thus, do not produce shadows. Objects almost directly below produce very short shadows. In order to produce long enough shadows for useful imaging, the objects must be at a horizontal distance away from directly below the transmitter/receiver. The horizontal distance is typically greater than 80% of the height of the receiver/transmitter above the bottom (corresponding to a sound ray incidence angle of 70° or less between the incident ray and the horizontal bottom). Thus, at 100 ft. altitude, a strip 80 ft. wide below the receiver transmitter is not "seen". This is referred to herein as a gap.

SUMMARY OF THE INVENTION

The bistatic side-scan sonar system described in this invention makes use of existing side-scan sonar techniques, but with modification to fill the gap that exists directly beneath the sonar transmitting and receiving equipment. This gap may be referred to as a "gap strip" to distinguish it from right and left strips to either side thereof. To obtain information lying in this gap by presently known methods require subsequent parallel passes of the vehicle.

Right and left sound sources are located at lateral distances on either side of the receiver and transmit at different frequencies. The right hand acoustic source transmits downwardly and to the left while the left hand acoustic source transmits downwardly and to the right. The spacings of the sources are such that shadows are created for objects of height on the floor or bed, even those directly beneath the receiver. This eliminates the gap that normally exists there.

It is therefore an object of the invention to provide an improved side-scan sonar.

It is another object of the invention to provide improved side-scan sonar capable of detecting objects on the ocean floor directly beneath the transmitter and receiver.

It is still another object of the invention to provide acoustic transmitting and receiving equipment arranged on a vehicle in a manner whereby an upstanding object on the floor is always "illuminated" by side directed acoustic pulses, thereby providing scan to include the gap strip as well as right and left strips.

Other objects of the invention will become apparent to one skilled in the art upon reading the specification with reference to the drawing.

DETAILED DESCRIPTION OF THE INVENTION

Figure 1:
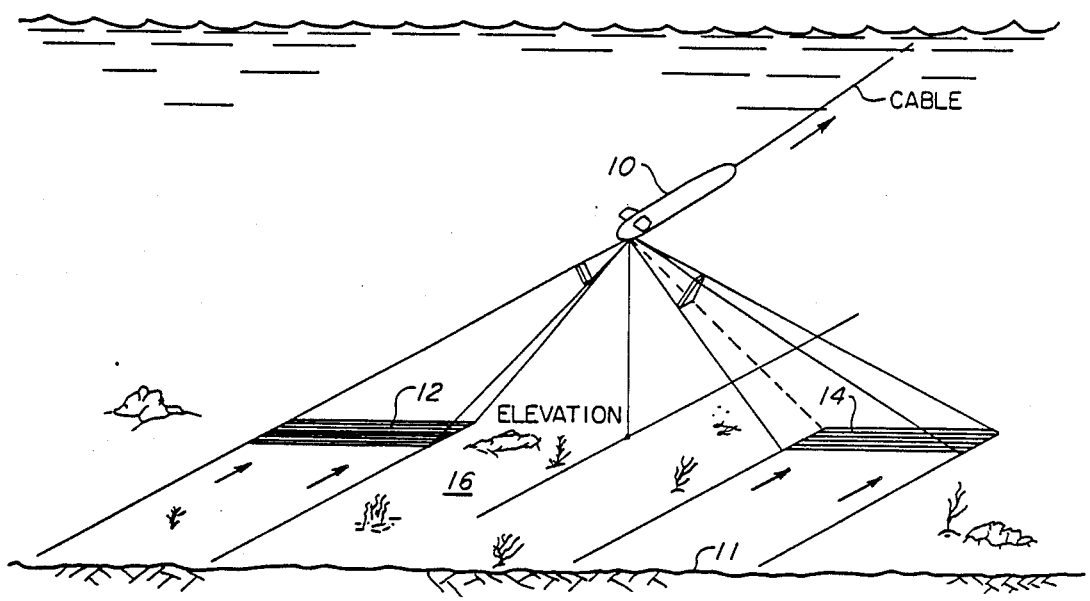
FIG. 1 is an illustration in perspective of presently known side-looking sonar scan geometry which includes a gap directly beneath the vehicle.

Referring first to FIG. 1, there is shown in operation a presently known side-looking sonar arrangement for scanning the bottom of the ocean floor. As vehicle 10 is towed along at a constant speed and at a predetermined elevation above the floor or bottom, sonar transmitters on opposites sides of the vehicle acoustically illuminate areas 12, 14 of the bottom, respectively, to the left and right side of vehicle 10. Echo is returned from the bottom to respective receivers in vehicle 10. It will be noted that a gap or gap strip 16 is left acoustically unilluminated below the vehicle, and, according, no echo information is received on this strip. Information on this strip may be obtained, however, by making a subsequent parallel passage of the vehicle.

Figure 1A:
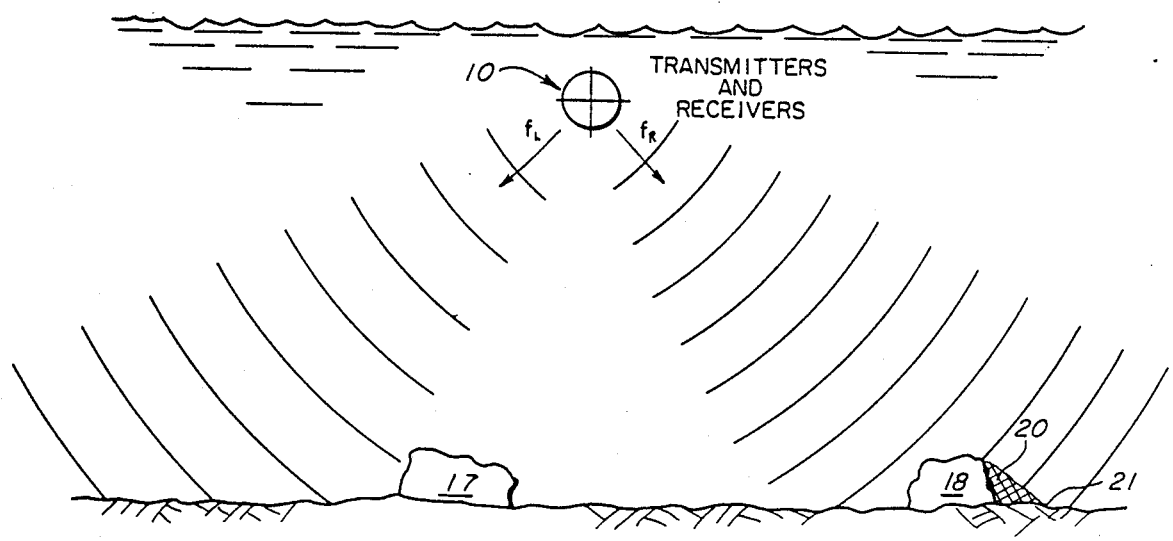
FIG. 1a is an end view representation of the vehicle of FIG. 1 in tow above the ocean floor and illustrating acoustic pulses directed toward the ocean floor.

FIG. 1a is an end-view representation of vehicle 10 of FIG. 1 wherein both right and left transmitters and receivers (not illustrated) are provided in vehicle 10. One transmitter on the right broadcasts downwardly and to the right at one frequency ($f_R$), while another transmitter on the left broadcasts downwardly and to the left at another frequency ($f_L$), as illustrated.

Figure 2:
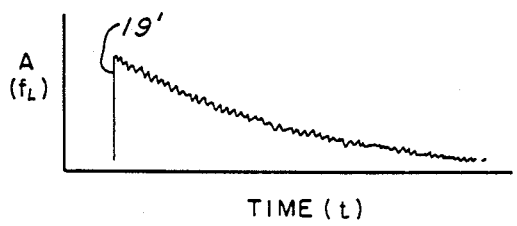
FIG. 2 is a graph (amplitude versus time) representing the signal corresponding to bottom echo from one transmitter frequency directed to the left ($f_L$).
Figure 3:
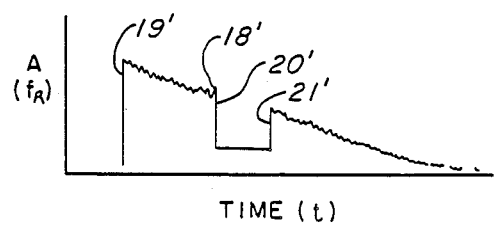
FIG. 3 is a graph similar to that of FIG. 2 wherein another transmitter frequency is directed to the right ($f_R$).

The FIG. 2 graph represents the recorded signal (amplitude A versus time t) corresponding to echoes received from acoustic transmission to the left ($f_L$). Object 17, even though it has height, casts no shadow from the overhead acoustic source ($F_L$). The amplitude signal rises sharply as indicated by numeral 19' in FIG. 2 when echo is first returned from the bottom, and, thereafter, simply diminishes with time as illustrated. The FIG. 3 graph represents the recorded signal corresponding to the echo returned from acoustic transmission to the right ($f_R$). This graph, too, decays with time, however it identifies an irregularity 18, shown in FIG. 1a, casting an acoustic shadow 20. The signal first rises vertically from the base line as it did in FIG. 2, indicating that the transmitted wave has reached the bottom. Thereafter, it decays as the wave reaches the bottom further away to the right. However, upon striking object 18 on the floor, there may be at first a slight rise 18' in the signal, the extent of which depends upon the nature of the object. Thereafter, as the transmitted acoustic compression wave travels past object 18, there is no reflection from the bottom for the length of shadow area 20, and the recorded signal drops precipitously as indicated by numeral 20', and continues at the low threshold. Once the acoustic wave again strikes bottom beyond the shadow at point 21, the recorded signal 21' returns vertically to substantially what it would have been at that time lapse had there been no object 18. The amplitude signal indicates an object on the floor having height sufficient to cast an acoustic shadow 20 caused by side acoustic illumination from transmitter ($f_R$). It will be obvious that an object on the bottom in a strip directly beneath and slightly to either side of vehicle 10 will present little or no shadow to acoustic transmission from above. Accordingly, no meaningful signal variation would be recorded.

Figure 4:
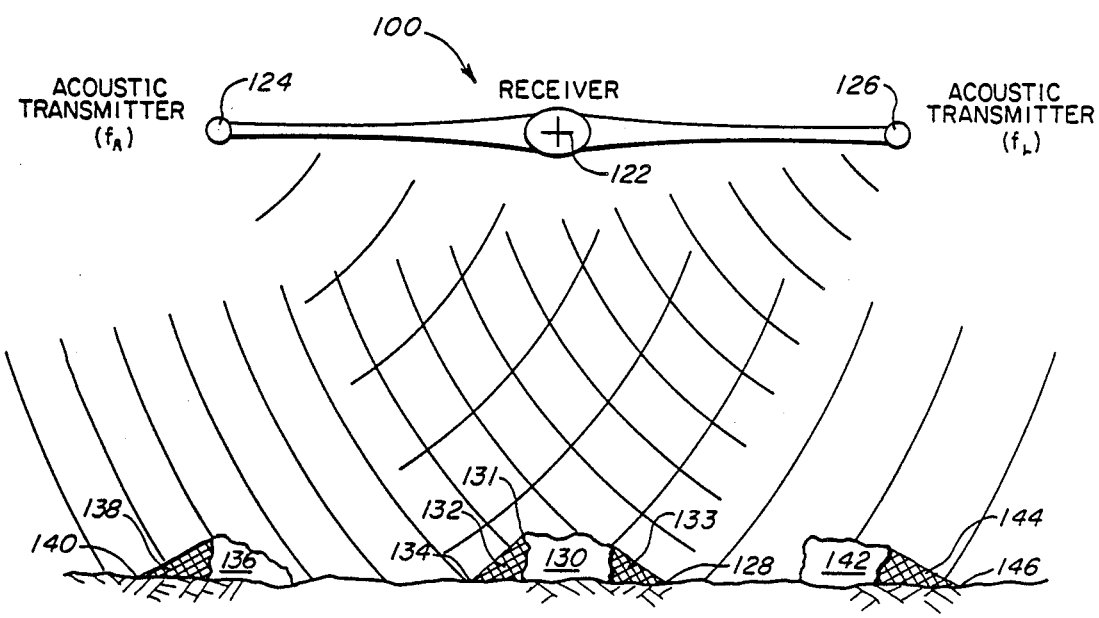
FIG. 4 is an end view of the vehicle according to the present invention illustrating acoustic pulses emitted from spaced apart right and left transmitters.

Referring now to FIG. 4, which is a representation of the present invention, there is illustrated a vehicle 100 defining a platform (sometimes called a fish) for carrying transmitters and receivers in the special arrangement. The vehicle comprises a central body 122, which houses and carries acoustic receivers, and a pair of outboard bodies 124 and 126 on the left and right sides, respectively, of the central body. The outboard bodies house and carry, respectively, acoustic transmitter ($f_R$) on the left side for broadcasting downwardly and toward the right at one frequency and acoustic transmitters ($f_L$) on the right side for broadcasting downwardly and toward the left at another frequency. The acoustic receivers in the central body are adapted to receive echoes of both frequencies and to discriminate one side from the other.

Outboard body portions 124 and 126 are located at considerable fixed distances on either side of central body 122. Vehicle 100 is usually towed by a cable at a constant speed through the water, with the outboard body portions horizontal, and at a predetermined height above the ocean floor. Mechanism and techniques for towing and positioning the vehicle are well known by those skilled in the art and need not be described herein.

Assuming vehicle 100, as illustrated in FIG. 4, to be traveling into the paper and away from the viewer, the acoustic transmitting source in body 124 at the left is set to broadcast down and to the right ($f_R$) at one frequency. The acoustic transmitting source in body 126 at the right is set to broadcast down and to the left ($f_L$) at another frequency. In this manner there will always be acoustic "side illumination" across the ocean floor in the strip beneath the receiver, as well as right and left strips to either side. Accordingly, objects of height on the ocean floor, including those objects directly below the receivers, will be bathed by acoustic fronts which are at first reflected by such objects, and then, after passing, encounter nothing but water until the front again reaches the floor at some distance farther away.

Figure 4A:
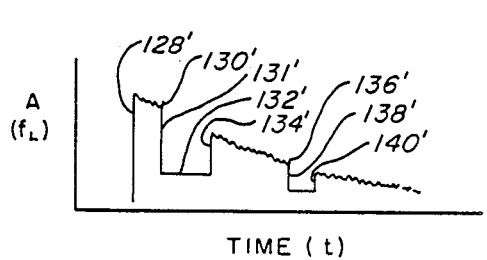
FIG. 4a is a graph (amplitude versus time) representing the signal corresponding to bottom echo resulting from the right hand source transmitter directed to the left ($f_L$)
Figure 4B:
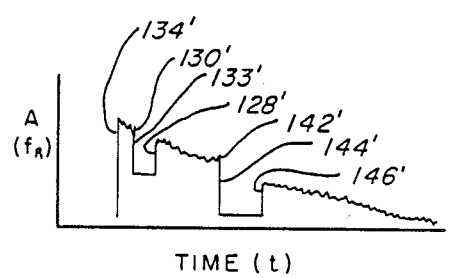
FIG. 4b is a graph similar to that of FIG. 4a wherein the left hand source transmits at another frequency toward the right ($f_R$).

The graphs in FIG. 4a and FIG. 4b represent signal amplitudes (A) of echoes received from the ocean floor and objects 130, 136 and 142 beneath vehicle 100 as illustrated in FIG. 4. A transmitter ($f_L$) located in outboard body 126 broadcasts an acoustic front down and to the left as illustrated. For a short period of time after being transmitted there is no echo, and therefore no recording for amplitude A in FIG. 4a. Upon the echo return from the bottom at the nearest point 128, there results a sharp amplitude increase 128' in the signal illustrated in FIG. 4a. The signal amplitude then fades with time until the acoustic wave front strikes object 130 on the bottom, whereupon it may first rise slightly, as indicated by numeral 130', depending upon the acoustic reflectivity of object 130. Then, because of the shadow caused by the upper corner 131 of the object the signal will drop precipitously as illustrated by numeral 131' on the graph in FIG. 4a. The amplitude of the signal remains at a low threshold 132' for the time it takes for the acoustic front (pulse) to traverse the distance of shadow 132 and again reach the floor. Upon reaching the floor at 134, the signal amplitude again rises, as illustrated by numeral 134', to decay thereafter in a normal fashion with respect to time. The wave front travels on, and the echo, upon reaching second object 136, may again first increase slightly as illustrated by 136' on the graph and thereafter drop off after the wave front passes into the shadow area 138 as represented on the graph by 138'. The echo will rise once again after the wave front reaches the bottom at 140 as indicated by 140' on the graph. The amplitude of the recorded signal A versus time corresponding to the acoustic echo is represented in FIG. 4a. A skilled operator, upon having the information of the signal in FIG. 4a, will recognize that objects are present on the floor beneath the receiver. There is no gap in the acoustic return from this strip area even through object 130 is directly beneath the vehicle and receiver.

In a similar manner, acoustic transmitter ($f_R$), located in left outboard body 124, broadcasts an acoustic front down and to the right at another frequency, as illustrated. The signal of amplitude versus time for echoes on this side is represented in FIG. 4b. At first, there is no echo during the time it takes for the acoustic pulse to reach the floor. Upon first striking the floor at location 134 there is an echo returned which, when converted to a signal, has a sharp amplitude rise 134' as illustrated in FIG. 4b. The signal decays slightly but rises slightly at 130' upon striking object 130. As the pulse passes object 130, and traverses the distance of shadow 133, the signal diminishes to a lower threshold 133'. It rises again, as illustrated by numeral 128', upon passing the shadow and reaching point 128 on the bottom. Thereafter, the signal decays to rise again at 142' upon the acoustic front striking object 142, with resulting echo travelling to the receiver in central body 122. Upon the acoustic front passing object 142, the echo and signal amplitude drops precipitously as indicated by numeral 144' in FIG. 4b, and remains low as the front passes shadow 144 to point 146, where it rises once again as illustrated by numeral 146' on the graph. In this manner, the amplitude of the signal in FIG. 4b indicates to a skilled operator the presence of objects 130 and 142 beneath and to the right of the receiver in vehicle 100. Again, it has been illustrated that no gap exists in the area containing objects 130 and 142.

By the arrangement of acoustic transmitting and receiving equipment carried on vehicle 100, as illustrated in FIG. 4, an object of height on the ocean floor will always be acoustically bathed by side illumination to provide shadows. Accordingly, there will be interruptions in the echoes returned to the receiver from objects on the floor beneath the receiver, thus providing telltale amplitude variations meaningful to skilled operators.

Again the advantage of the present arrangement is that there is no gap in information corresponding to the strip beneath the vehicle, as was present in previously known equipment, FIG. 1, for example. It is no longer necessary to rescan an already scanned area from a slightly different location simply to fill that gap.

OPERATION

Figure 5:
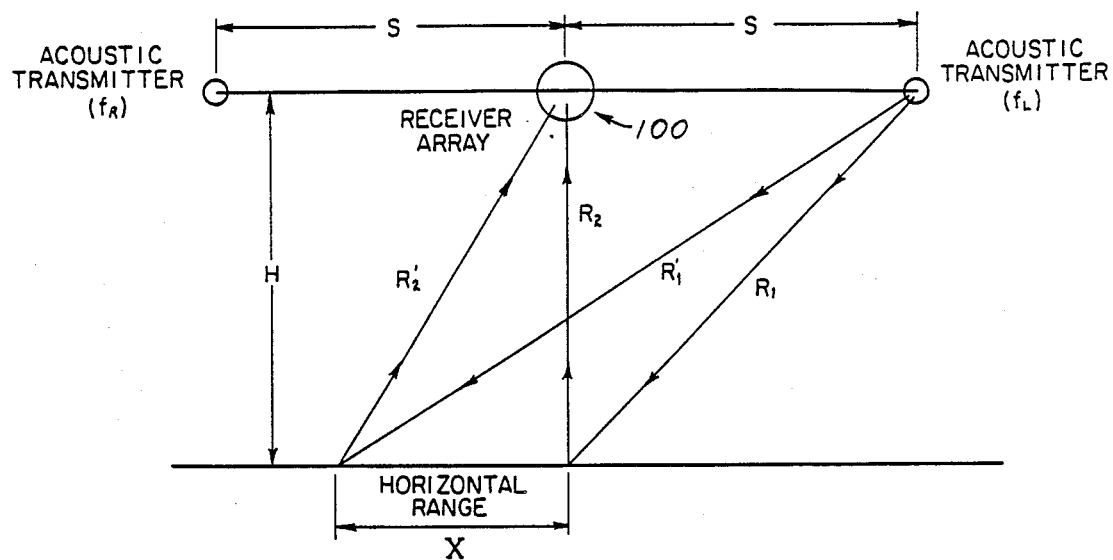
FIG. 5 is a representation of the geometry of the transmitters and receiver in scan mode.
Figure 6:
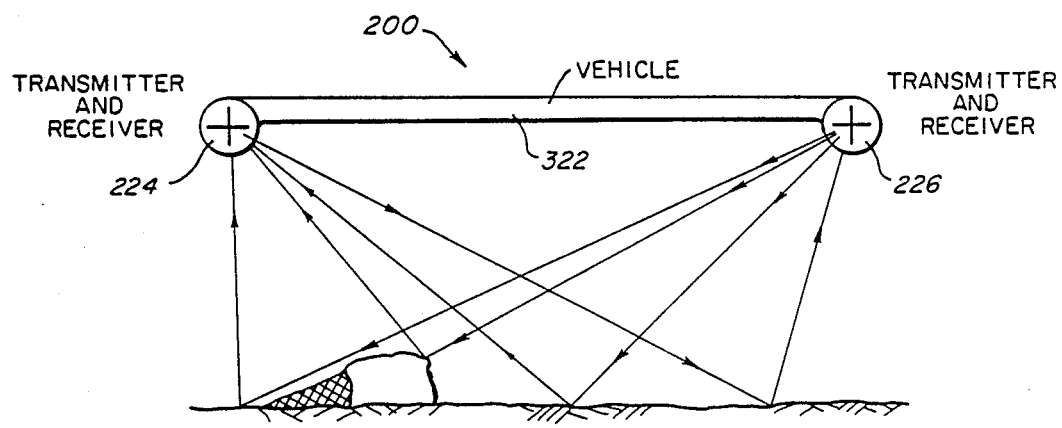
FIG. 6 is an alternate arrangement of the transmitters and receivers.

Reference is now made to the illustrations in FIGS. 5 and 6 where vehicle 100, carrying the bistatic sidescan sonar array, travels into the paper.

The sources for the left and right hand sides are each displaced by distance S from a standard side scan sonar receiver array. This allows shadows of objects on the bottom directly below the receiver to be detected and displayed on a line scan system. Consider the echo tracing created by the receiver and the right hand transmitter which projects frequency $f_L$. The receiver is gated on at time $$t_o = \frac{R_1 + R_2}{c} = \frac{H + \sqrt{S^2 + H^2}}{c}$$

after the source sends out a pulse, where c is the speed of sound. This begins the trace on the display. The trace continues until the maximum horizontal range, $X_{max}$, for a single sideways scan is reached. A typical value for $X_{max}$ is 10H. For good shadow production under the receiver, the separation S should be 0.2H or greater.

At any time t after the gate-on time the horizontal range is determined by $R_1 + R_2 = ct$ from the equation $$X = \left(\frac{ct}{2}\right)\left[1 - \frac{H^2}{(ct/2)^2 - (S/2)^2}\right]^{\frac{1}{2}} + S/2$$

When S=0, this reduces to the usual horizontal range equation $$X = \left[\left(\frac{ct}{2}\right)^2 - H^2\right]^{\frac{1}{2}}$$

for monostatic echo ranging, with X being the horizontal range along the bottom rather than the radial range, ct/2, from the source/receiver to the bottom.

$$X = \left(\frac{ct}{2}\right)\left[1 - \frac{H^2}{(ct/2)^2 - .01H^2}\right]^{\frac{1}{2}} + 0.1H$$

After the sound pulse is sent out from the left side or right side transmitter, the receiver output is an echo amplitude (voltage) as a function of time. The echo amplitude can modulate the intensity of a display directly, using a constant horizontal scan rate, in which case the "horizontal position" on the display (i.e., the distance long it) will not be simply proportional to the horizontal range X. Alternately the output from a complete scan (i.e., as the acoustic pulse travels from X=0 out to the maximum range) can be stored in a computer and then plotted on the screen as V (voltage) vs X, with X calculated from the above formula. The resulting display would be linear in terms of distance on the screen being proportional to the range, X.

ALTERNATE EMBODIMENT

In the alternate embodiment of the invention, as illustrated in FIG. 6, vehicle 200 is comprised of a central 4 body 322 with outboard body portions 224 (left) and 226 (right) each of which houses sonar transmitting and receiving equipment. As before, the transmitter at the right transmits downwardly and to the left at one frequency while the transmitter at the left transmits downwardly and to the right at another frequency. In this manner objects of height on the ocean floor beneath the vehicle will be acoustically illuminated from the sides by at least one of the transmitters. The receiver at the left is adapted to receive echoes from the bottom or objects initiated by the frequencies of acoustic transmission from the transmitter at the right. The receiver on the right receives echoes initiated from the transmitter at the left in the same manner.

The operation for the FIG. 6 embodiment is similar to that described for FIG. 5. While the transmitter for one side is colocated with the receiver for the other side, the transmitter and receiver relationship for either side is slightly different. In this case the receiver should be gated on at time $$t_o = 2/c \, [(S/2)^2 + H^2]^{\frac{1}{2}}$$

and the horizontal distance X at any time t is given by $$X = ct/2 \left[1 - \frac{H^2}{(ct/2)^2 - (S/2)^2}\right]^{\frac{1}{2}}.$$

While two embodiments of the invention have been shown and described, it will be obvious to those skilled in the art that changes and modifications may be made thereto without departing from the spirit of the inven-

We claim:

1. Apparatus for scanning linear strip areas of ocean floor including a gap strip beneath a moving vehicle as well as strips to right and left sides of the vehicle for locating objects having height extending above the ocean floor, comprising:
   a vehicle adapted to be moved through water at a determined elevations above the ocean floor;
   said vehicle having a body including a central portion and outboard portions located at fixed lateral distances on the right and left sides thereof relative to direction of vehicle movement;
   acoustic transmitting means carried by the outboard portions; and,
   acoustic receiving means carried by the central portion for receiving acoustic echoes from the floor;
   said acoustic transmitting means on the right transmitting acoustic signals at one frequency downwardly and to the left for acoustically illuminating at least the left half of the gap strip and the strip to the left thereof and causing acoustic shadows to be cast to the left side of objects therein which have height above the ocean floor;
   said acoustic transmitting means on the left transmitting acoustic signals at another frequency downwardly and to the right for acoustically illuminating at least the right half of the gap strip and the strip to the right thereof and causing acoustic shadows to be cast to the right side of objects therein which have height above the ocean floor;
   said acoustic receiving means adapted to receive bottom echoes of both frequencies, including the effect of right and left acoustic side shadows;
   whereby the scanned areas of the ocean floor includes the gap strip as well as the strips to the right and left sides thereof.

2. Apparatus for scanning linear strip areas of ocean floor including a gap strip beneath a moving vehicle as well as right and left strips to either side thereof for locating objects having height above the ocean floor, comprising:
   a vehicle adapted to be propelled linearly through water at a predetermined elevation above the ocean floor;
   said vehicle having a body portion including spaced apart outboard extremities fixedly located on the right side and left side of the vehicle relative to its direction of movement;
   sonar transmitting and receiving means carried by each outboard extremity;
   said sonar transmitting means on the right transmitting acoustic signals at one frequency downwardly and to the left for acoustically illuminating a substantial portion of the gap strip and the strip to the left thereof and casting left side acoustic shadows from objects therein having height above the ocean floor;
   said sonar transmitting means on the left transmitting acoustic signals at another frequency downwardly and to the right for acoustically illuminating a substantial portion of the gap strip and strip to the right thereof and casting right side acoustic shadows from object therein having height above the ocean floor;
   said sonar receiving means on the right adapted to receive bottom echoes, including effect of acoustic side shadows, initiated by the sonar transmitting means on the left;
   said sonar receiving means on the left adapted to receive bottom echoes, including effect of acoustic side shadows, initiated by the sonar transmitting means on the right;
   whereby scanned areas of the ocean floor include the gap strip as well as the strips either side thereof.

3. The invention according to claim 2 wherein the outboard extremities of the body portion each house the sonar transmitting and receiving equipment.

4. A method of scanning linear strip areas of ocean floor for locating objects having height extending above the ocean floor, comprising:
   moving a vehicle linearly through water at predetermined elevations above the ocean floor;
   locating acoustic transmitting sources at fixed distances from each other on right and left sides of the vehicle relative to its line of movement through the water;
   locating acoustic receiving means on the vehicle;
   causing the source on the right to acoustically transmit downwardly and to the left at one frequency for acoustically illuminating the ocean floor at the frequency and casting left acoustic shadows from objects having height in an area from substantially vertically beneath and to the left of center of the vehicle;
   causing the source on the left to acoustically transmit downwardly and to the right at another frequency for acoustically illuminating the ocean floor at that frequency and casting right acoustic shadows from objects having height in an area from substantially vertically beneath and to the right of center of the vehicle; and,
   receiving acoustic echoes, including effects of the acoustic shadows, initiated by both right and left acoustic sources;
   whereby the scanned areas of the ocean floor include a gap strip beneath the vehicle.

5. The method according to claim 4 further defined by locating the acoustic receiving means on the right and left sides of the vehicle.

6. The method according to claim 5, comprising receiving on the right of the vehicle acoustic echoes initiated by acoustic transmission from the left and receiving on the left of the vehicle acoustic echoes initiated by acoustic transmission from the right.

* * * * *